United States Patent [19]

Lawrence et al.

[11] 4,432,590

[45] Feb. 21, 1984

[54] STRUCTURAL SYSTEM FOR SUPPORTING FURNITURE, SHELF AND WALL PANELS

[75] Inventors: Phillip G. Lawrence, Spring Lake; Robert L. Russell, Kentwood, both of Mich.

[73] Assignee: Jer Manufacturing, Inc., Coopersville, Mich.

[21] Appl. No.: 218,780

[22] Filed: Dec. 22, 1980

[51] Int. Cl.³ .................... A47B 43/00; A47B 47/00; E04B 1/00; F16B 12/00
[52] U.S. Cl. .................... 312/257 SK; 312/257 A; 108/156; 52/281; 403/171; 403/231; 16/225
[58] Field of Search ............ 52/263, 281, 36; 16/225; 403/231, 171, 176; 312/138 R, 326, 111, 257 SK; 108/156

[56] References Cited

U.S. PATENT DOCUMENTS

| | | |
|---|---|---|
| 743,279 | 11/1903 | Haycock . |
| 1,936,733 | 11/1933 | Richardson ............... 312/330 R |
| 2,475,079 | 7/1949 | Clouse et al. ............... 312/257 SK |
| 2,669,497 | 2/1954 | Bailey ............... 403/231 |
| 2,873,035 | 11/1956 | Unis ............... 211/135 |
| 2,956,705 | 10/1960 | Clingman ............... 220/80 |
| 3,144,265 | 8/1964 | Humble ............... 287/54 |
| 3,353,854 | 11/1967 | Hansen ............... 287/189.36 |
| 3,431,591 | 3/1969 | Betso ............... 16/171 |
| 3,648,419 | 3/1972 | Marks ............... 52/36 |
| 3,800,494 | 4/1974 | Hall et al. ............... 403/231 |
| 3,881,428 | 5/1975 | Klecki ............... 108/27 |
| 3,901,164 | 8/1975 | Urti ............... 52/281 |
| 3,973,371 | 8/1976 | Heller ............... 403/171 |
| 3,981,251 | 9/1976 | Damberg ............... 108/154 |
| 3,985,083 | 10/1976 | Pofferi ............... 108/111 |
| 4,014,618 | 3/1977 | Kristiansen ............... 403/205 |
| 4,066,370 | 1/1978 | Van Driessche ............... 403/217 |
| 4,071,990 | 2/1978 | Traber ............... 403/231 |
| 4,076,432 | 2/1978 | Glaser ............... 403/176 |
| 4,118,267 | 10/1978 | Vogel ............... 156/293 |
| 4,124,186 | 11/1978 | Call, Sr. ............... 248/188 |
| 4,124,322 | 11/1978 | Parisien ............... 403/295 |
| 4,125,338 | 11/1978 | Lew ............... 52/285 |
| 4,139,925 | 2/1979 | De Meo ............... 16/170 |
| 4,161,977 | 7/1979 | Baslow ............... 160/381 |
| 4,168,922 | 9/1979 | Worrallo ............... 403/231 |
| 4,335,547 | 6/1982 | Maxwell ............... 52/36 |

FOREIGN PATENT DOCUMENTS

| | | | |
|---|---|---|---|
| 2268970 | 11/1975 | France ............... | 52/657 |
| 2339724 | 8/1977 | France ............... | 16/225 |
| 872764 | 7/1961 | United Kingdom ............ | 312/138 R |

Primary Examiner—John E. Murtagh
Assistant Examiner—Michael Safavi
Attorney, Agent, or Firm—Price, Heneveld, Huizenga & Cooper

[57] ABSTRACT

A skeletal framework is provided for supporting furniture, shelf, wall and other types of structural panels. The framework comprises a plurality of elongate frame members, each having a generally rectangular cross section. At least one side of each of the frame members is provided with an axially extending slot. Each of the axially extending slots is provided with a generally dovetail-shaped cross section. A plurality of corner connectors are provided for interconnecting first, second and third frame members which usually extend in mutually orthogonal directions. The corner connectors are each provided with first, second and third extensions for extending into and engaging the axially extending slots disposed on the first, second and third frame members, respectively. A plurality of corner locks are provided, one corner lock being received in each corner member. Each of the corner locks comprise a stake, which extends through the corner members and engages the first and second frame members, and a fastener, which extends through the stake and the corner members, the fastener engaging the third frame member for drawing the stake, the corner connector and the first, second and third frame members theretogether. Various types of paneling may be mounted in the skeletal framework so assembled. Additional elements are provided for mounting door panels and shelf panels. Other elements are provided for interconnecting modules formed from the structural system of the present invention and wall mounting one or more of the modules.

39 Claims, 35 Drawing Figures

STRUCTURAL SYSTEM FOR SUPPORTING FURNITURE, SHELF AND WALL PANELS

BACKGROUND OF THE INVENTION

This invention relates generally to a structural system for assembling furniture, shelf, wall and other types of structural panels into a wide variety of utilitarian structures. More particularly, the present invention is directed to such a structure that may be packaged and marketed in kit form.

A wide variety of structural systems exist for supporting furniture, shelving, wall or other types of structural panels. The design of these systems presents a difficult compromise between providing a system having aesthetic appeal and providing a system with the rigidity necessary to provide a sound and usable structure. Some such structural systems employ a large number of bolts and other connecting elements which provide the necessary rigidity but are aesthetically unappealing. In other systems the rigidity of the structure is sacrificed for the sake of appearance. In still other systems the structural rigidity of the system is maintained with an aesthetically appealing structure only by the use of various covering members for hiding the basic structural system. In the latter case, such structural systems can be quite complex. The complexity of many of these prior art systems makes many of these systems both difficult to manufacture and difficult to install, particularly for an inexperienced installer such as a homeowner.

SUMMARY OF THE INVENTION

According to the present invention, a structural system is provided for supporting furniture, wall, shelf and other structural panels which strikes a new balance between the heretofore conflicting goals of providing an aesthetically appealing structure and rigid usuable structure. Furthermore, the structural system of the present invention is simple to manufacture and install.

The skeletal framework of the present invention comprises a plurality of elongate frame members each having a generally rectangular cross section. At least one side of each of the frame members is provided with an axially extending slot. Each of the axially extending slots is provided with a cross-sectional shape which is substantially wider in some areas than the entrance width of the slot. In preferred embodiments the axially extending slots are provided with a generally dovetail-shaped cross section. A plurality of corner connectors are provided for interconnecting first, second and third frame members. The first, second and third frame members are generally disposed in mutually orthogonal directions for the purpose of assembling a portion of a furniture, wall or shelf module constructed from the skeletal framework. The corner connectors are each provided with first, second and third extensions for extending into and engaging the axially extending slots disposed on the first, second and third frame members, respectively. A plurality of corner locks are provided and each of the corner connectors is provided with means for slidably receiving and guiding the corner locks. Each of the corner locks comprises a stake extending through a corner connector and engaging the first and second frame members. The corner lock also includes a fastener which extends through the stake and the corner connector, the fastener engaging the third frame member for drawing the stake, the corner connector and the first, second and third frame members theretogether. After assembling a skeletal framework in this fashion, a variety of panels may be used offering optional finishes, textures and patterns. The panels are received in the axially extending slots provided in the frame members. Additional elements are provided for mounting door panels and shelf panels. Other elements are provided for interconnecting modules formed from such framework and paneling and wall mounting one or more of the modules. The structural system of the present invention can be packaged as a kit which a homeowner will use to assemble a wide variety of utilitarian structures.

BRIEF DESCRIPTION OF THE DRAWINGS

FIG. 2 is a perspective view of a first assembly step in an assembly procedure for constructing a simple shelf or cabinet structure. In FIG. 2 a plurality of corner connectors are added to the ends of four elongate frame members.

DESCRIPTION OF THE PREFERRED EMBODIMENTS

Figure 1:
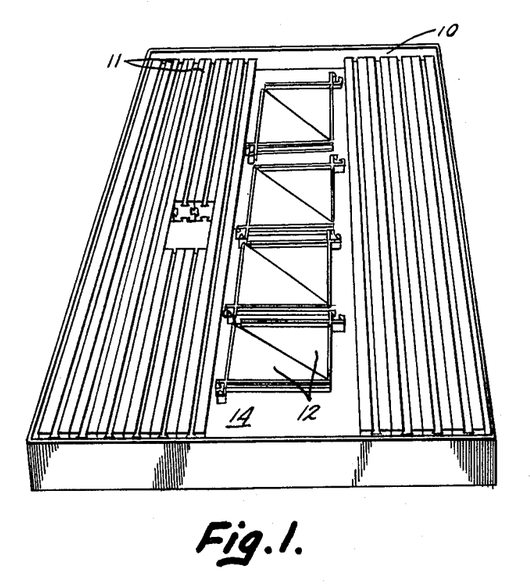
FIG. 1 is a perspective view of the structural system of the present invention prepackaged in kit form.

With reference to FIG. 1, the structural system of the present invention is illustrated in an unassembled kit form. The apparatus of the present invention packaged within the box 10 includes a plurality of elongate frame members 11, a plurality of corner connectors 12 and a plurality of corner locks not illustrated in FIG. 1. The elongate frame members 11, the corner connectors 12 and the corner locks which are to be hereinafter described are used for constructing a skeletal framework for supporting a wide variety of furniture, wall, shelf and structural panels. These panels may form a portion of the kit illustrated in FIG. 1 and may, for example, be disposed at 14, filling the lower portion of the kit.

Figures 10, 11:
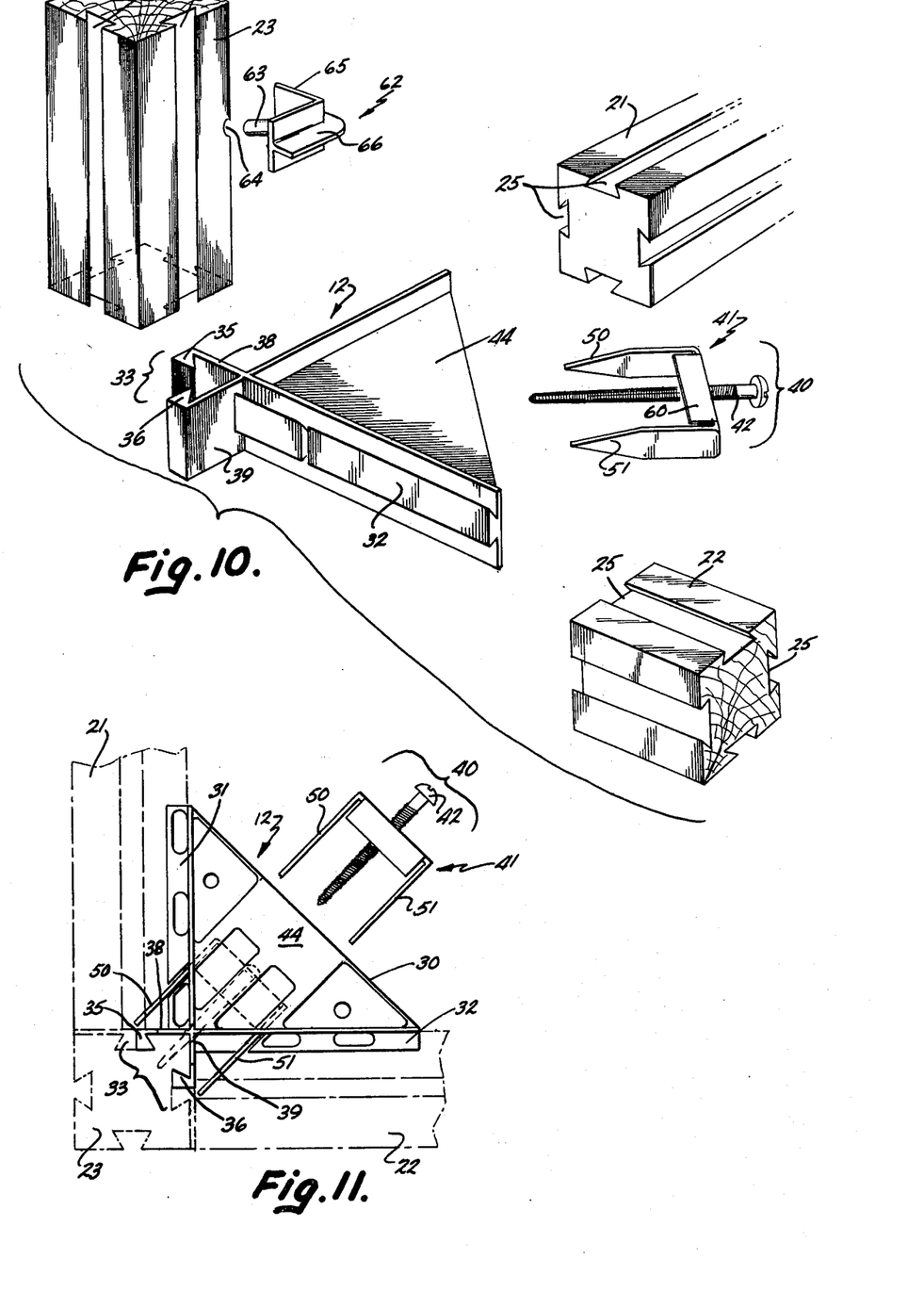
FIG. 10 is an exploded assembly of first, second and third frame members interconnected by a corner connector and a corner lock.
FIG. 11 is a plan view of first, second and third frame members shown interconnected by a corner connector and a corner lock.

With reference now to FIG. 10 which is an exploded assembly of one corner of the skeletal framework of the present invention it is illustrated that the structural framework comprises first, second and third elongate frame members 21, 22 and 23, respectively. Each of the elongate frame members is provided with a generally rectangular cross section. At least one side of each of the frame members is provided with an axially extending slot such as the slots 25. In most cases it is preferable to provide each of the elongate frame members with an axially extending slot on each side of the frame members. This provides the maximum construction flexability. Each of the axially extending slots 25 is provided with a cross-sectional shape which is substantially wider in some areas than at the entrance width of the axially extending slots. In preferred embodiments it has been found to be most convenient to provide the axially extending slots with a dovetail-shaped cross section. A plurality of corner connectors such as the one illustrated at 12 are provided for interconnecting the first, second and third frame members 21, 22 and 23, respectively. Although it is possible to construct frame connectors according to the present invention which accommodate frame members which are to be assembled at various intersecting angles, almost all conceivable structures which will be built with the structural system of the present invention will involve first, second and third frame members which intersect at right angles. Thus, in FIG. 10, the first, second and third frame members are illustrated in a mutually orthogonal relationship. With reference now also to FIG. 11 which is a plan view of the corner assembly, it is illustrated that the corner connector 12 further includes first, second and third extensions 31, 32 and 33 for engaging the axially extending slots 25 disposed on the first, second and third frame members, respectively. Preferably, the extensions 30 through 33 are provided with a cross-sectional shape that at least partially corresponds to the cross-sectional shape of the axially extending slots 25. For reasons that will hereinafter be explained, in preferred embodiments the first and second extensions 31 and 32 are provided with a dovetail-shaped cross section that closely matches the cross section of the axially extending slots 25 and the third extension 33 is formed from a pair of projections 35 and 36 disposed on arms 38 and 39. The projections 35 and 36 are provided with a cross-sectional shape that is approximately equal to one half of the cross-sectional shape of the dovetail-shaped slots 25.

The skeletal framework of the present invention further includes a plurality of corner locks 40. Each of the corner locks 40 is slidably received and guided by the corner connectors 30. Each of the corner locks 40 comprises a stake 41 and a fastener 42. The stake 41 extends through the corner connector 30 and engages the first and second frame members 21 and 22. The fastener 42 extends through the stake 41 through the corner connector 30 and into the third frame member 23 for drawing the stake 41, the corner connector 30, the first frame member 21, the second frame member 22 and the third frame member 23 theretogether.

Figure 12:
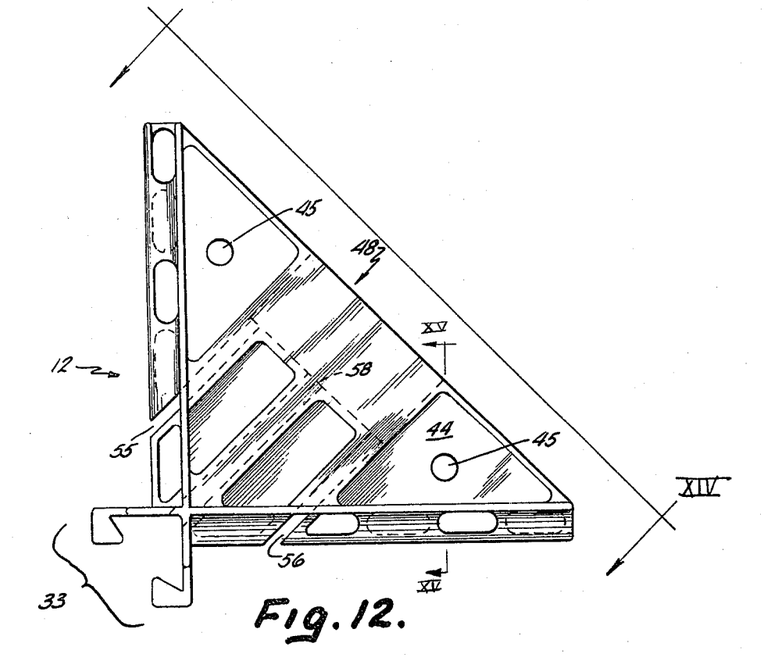
FIG. 12 is a plan view of a corner connector.
Figure 13:
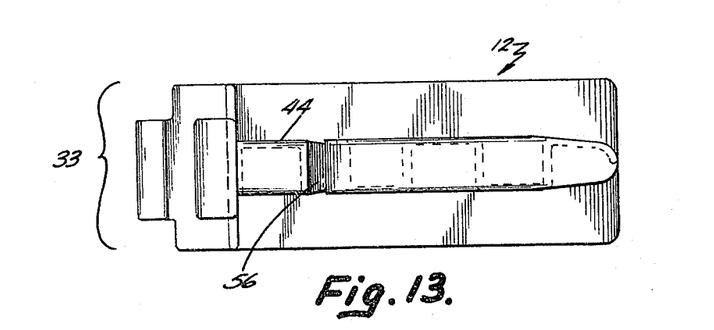
FIG. 13 is an elevational view of a corner connector.
Figure 14:
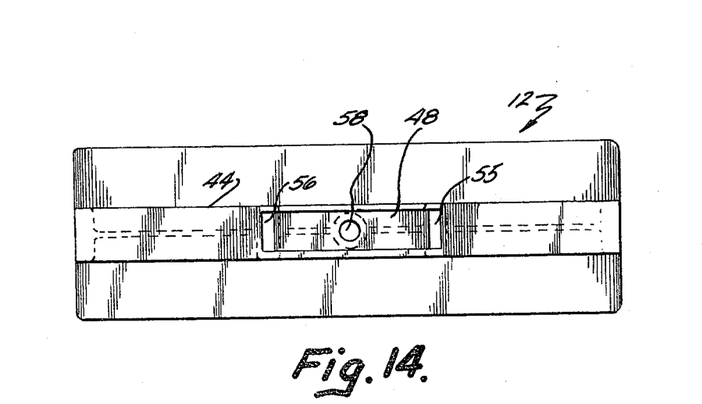
FIG. 14 is a view of the corner connector of FIG. 12 taken along line XIV—XIV.
Figure 15:
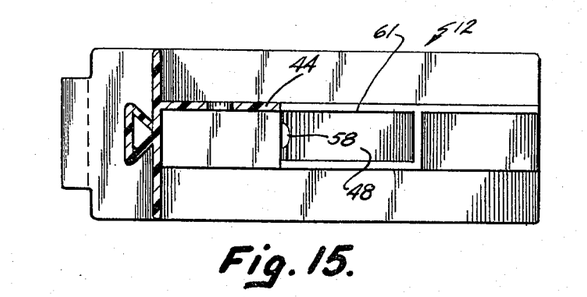
FIG. 15 is a sectional view of the corner connector of FIG. 12 taken along line XV—XV of FIG. 12.

The corner connectors 12 each include a roughly triangular web 44 interconnecting the first, second and third extensions 31, 32 and 33. As best illustrated in FIGS. 12 through 15, preferably the corner connectors 12 are molded from a polymeric material and the corner connectors are appropriately relieved to economize the amount of material used in the casting. The triangular web 44 serves as a platform upon which horizontal shelf panels may be rested. As best illustrated in FIG. 12, the triangular web 44 may be provided with a number of apertures such as the apertures 45 to provide for the use of optional fasteners for securing the shelf panel to the corner connector.

With particular reference to FIG. 10 and FIGS. 17 through 19, the stake 41 of the corner locks 40 is illustrated in further detail. The stake 41 is roughly U-shaped and includes first and second blades 50 and 51. The blades 50 and 51 are interconnected by a platform 53. The platform 53 includes an aperture 54 for receiving the fastener 42. The blades 50 and 51 are received by the means for slidably receiving the lock generally indicated by the numeral 48. The means for slidably receiving the lock comprises first and second slots 55 and 56 for guiding the blades 50 and 51, respectively into engagement with the first and second frame members 21 and 22, respectively. The means for slidably receiving the lock generally indicated by the numeral 48 further includes a central aperture 58 for receiving the fastener 42 of the lock 40. The platform 53 of the stake 41 includes tabs 60 which together with the sides of the first and second blades 50 and 51 define a roughly rectangular shape that is slidably received in rectangular aperture 61 in the means for slidably receiving and guiding 48. As best illustrated in FIG. 11, when the first, second and third frame members 21, 22 and 23 are assembled with a corner connector 12, the first and second frame members 21 and 22 abut the arms 38 and 39 of the third extension of the corner connector 12 as well as the third frame member 23. The arc extending between the first and second frame members 21 and 22 is, in most cases, approximately 90°. The blades 50 and 51 of the stake 41 are guided into the first and second frame members 21 and 22, respectively, by the slots 55 and 56, at an angle equalling approximately one half the arc extending between the first and second frame members. The fastener 42 extends through the aperture 54 in platform 53, through the corner connector 12 and into the third frame member 23. With the blades 50 and 51 slidably received in the slots 55 and 56, engagement of the third frame member 23 by the fastener 42 drives the blades 51 and 52 into the first and second frame members 21 and 22 at approximately a 45° angle. This urges the first and second frame members 21 and 22 into snug engagement with the corner connector 12 and the abutting third frame member 23 which is drawn toward the corner connector 12 and the other two frame members by the fastener 42. This straight-forward and ingenious arrangement securely binds the corner connector 12 and the first, second and third frame members into a structurally rigid framework with a minimum of complexity.

With reference to FIGS. 10, 20, 21, 22 and 26, it is illustrated that the skeletal framework of the present invention may be adapted for supporting a plurality of shelf panels by provision of a shelf hanger 62. The shelf hanger 62 includes a post 63 adapted for insertion in an aperture 64 provided in the third frame member 23 illustrated in FIG. 10. A shoulder 65 surrounds the post 63 and engages the sides of the frame member 23. Preferably the aperture 64 is disposed between adjacent sides of the frame member 23 and the shoulder 65 extends along adjacent sides of the frame member 23. A flange 66 extends from the post 63 and the shoulder 65 for supporting a shelf panel 69. The shelf hanger 62 may be provided with apertures 70 in either or both of the shoulder 65 and the flange 66 for using fasteners to secure the shelf hanger 62 to one or more of the third frame member 23 or the shelf 69. FIG. 27 illustrates an alternative embodiment of the invention wherein a simple dowel post 71 is disposed in the aperture 64 in frame member 23 for supporting the shelf 69.

Figure 23:
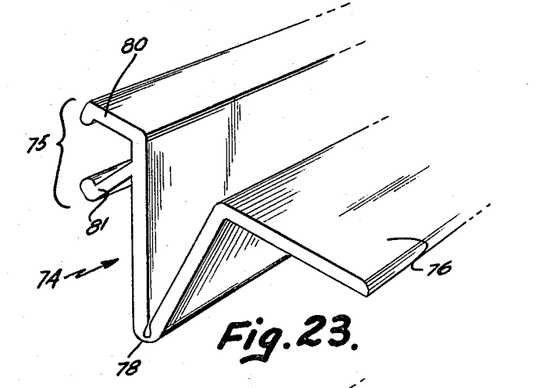
FIG. 23 is a perspective view of a door hinge constructed according to the present invention.
Figure 26:
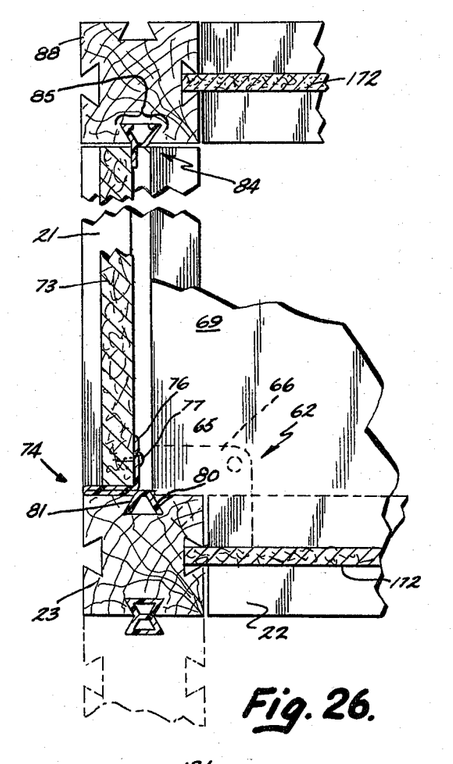
FIG. 26 is a cross-sectional view of a cabinet or shelf module constructed with the structural framework of the present invention illustrating the use of the hinge hanger of FIGS. 20-22, the door hinge of FIG. 23, the door stop of FIG. 24 and the module connector of FIG. 25.
Figure 27:
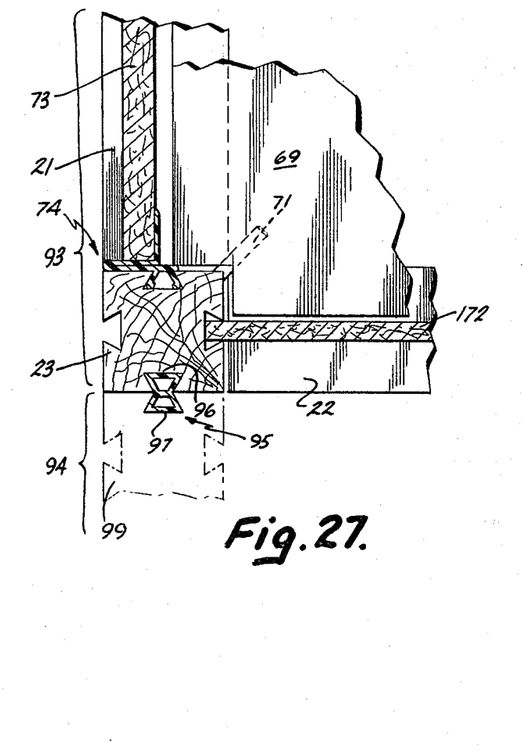
FIG. 27 is a partial sectional view of a cabinet or shelf structure constructed with the structural framework of the present invention illustrating the use of an optional type of shelf hanger.

With reference now to FIGS. 23 and 26, it is illustrated that the skeletal framework of the present invention may be adapted for supporting a door panel 73 by provision of a hinge 74. The hinge 74 comprises an elongate hinge hanger 75 for engaging an axially extending slot 25 disposed in a vertically oriented frame member 23. An elongate hinge flange 76 is provided for engaging one end of the door panel 73. The hinge flange 76 may be secured to the door panel 73 by any suitable means and for example, may be secured thereto with a plurality of fasteners 77. An elongate living hinge 78 is disposed between the hinge hanger 75 and the hinge flange 76. Preferably the hinge hanger, hinge flange and the living hinge are formed together from a polymeric material in a continuous extrusion process. In preferred embodiments, the hinge hanger comprises two elongate resilient hinge arms 80 and 81 oriented such that the hinge arm define a shape that at least roughly corresponds to a portion of the cross-sectional shape of the axially extending slots 25. The resilient hinge arms 80 and 81 are adapted to be compressed or urged together to facilitate insertion of the hinge hanger into the axially extending slot disposed in the frame member 23.

Figure 24:
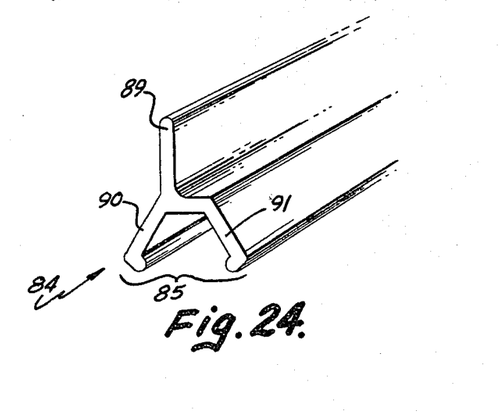
FIG. 24 is a perspective view of a door stop constructed according to the present invention.

With reference now to FIGS. 24 and 26, it is illustrated that the skeletal framework of the present invention may be adapted for supporting a door panel 73 and a door panel stop member 84. The door panel stop member 84 comprises a door stop hanger 85 for engaging an axially extending slot disposed in the vertical frame member 88 in FIG. 26. A door stop flange 89 is provided for abutting one edge of the switching door panel 73. In preferred embodiments, the door stop hanger 85 comprises two elongate resilient door stop hangers arms 90 and 91 oriented such that the door stop arms define a shape at least roughly corresponding to a portion of the cross-sectional shape of the axially extending slots of the vertically oriented frame member 88. Thus, the door stop arms may be urged together to facilitate insertion of the door stop in the axially extending slot of the frame member 88. In preferred embodiments, the door stop hanger and the door stop flange are both elongate members formed together from a polymeric material in a continuous extrusion process.

Figure 25:
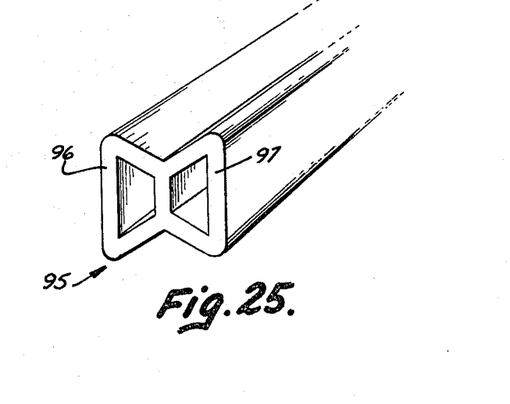
FIG. 25 is a perspective view of a module connector constructed according to the present invention.

With reference now to FIGS. 25 and 27, it is illustrated that the skeletal framework of the present invention is adapted for supporting modules of wall, furniture, shelf and other structural panels such as the modules partially illustrated at 93 and 94 in FIG. 27. The modules 93 and 94 are interconnected by a module connector 95. The module connector 95 comprises first and second modules extensions 96 and 97 mounted together in a back-to-back relationship. The first and second module extensions 96 and 97 engage axially extending slots disposed in a pair of adjacent vertically oriented frame members 23 and 99 disposed in adjacent modules 93 and 94, respectively. Preferably, the first and second module extensions 96 and 97 are provided with a cross-sectional area roughly corresponding to the cross-sectional shape of the axially extending slots. Furthermore, in preferred embodiments, the first and second module extensions 96 and 97 are elongate members formed together from a polymeric material in a continuous extrusion process. As with all of the elements of the structural framework of the present invention that are formed by a continuous extrusion process, an indeterminate length of the materials may be provided in each kit. The length of material being sufficient to offer the user of the kit a wide variety of construction alternatives.

Figure 11A:
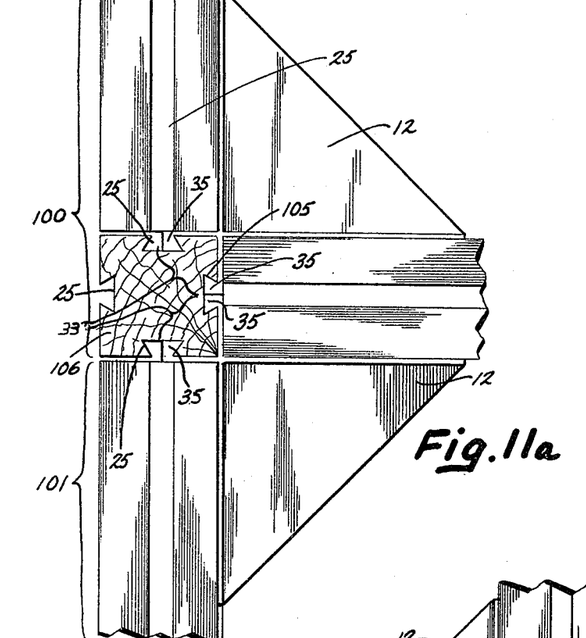
FIG. 11a is a plan view of four frame members interconnected by two corner connectors.
Figure 11B:
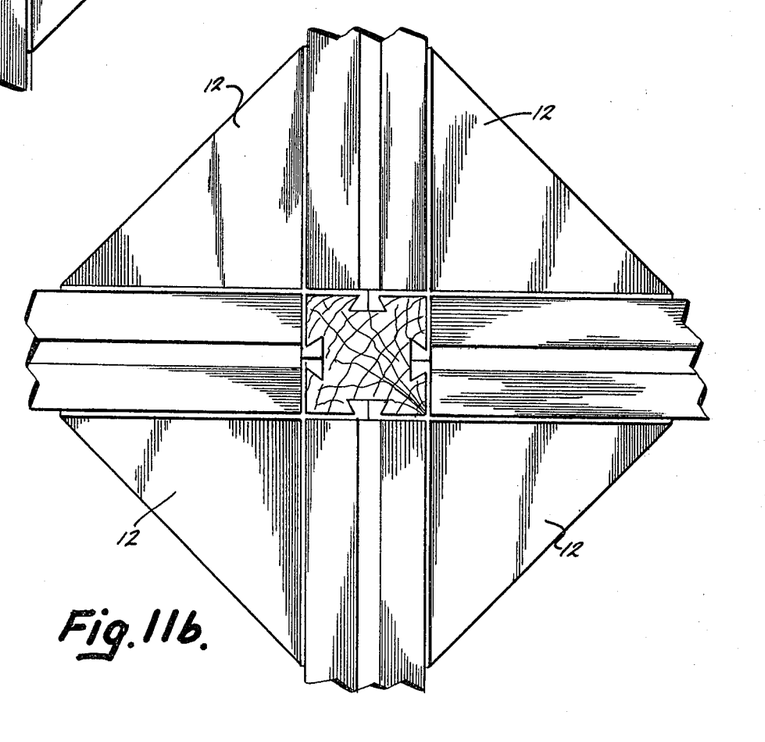
FIG. 11b is a plan view of five frame members interconnected by four corner connectors.
Figure 16:
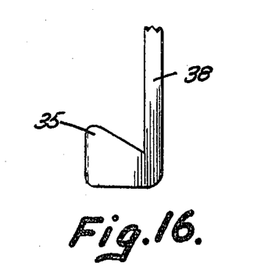
FIG. 16 is a partial view of one of the extensions of the corner connectors.
Figure 17:
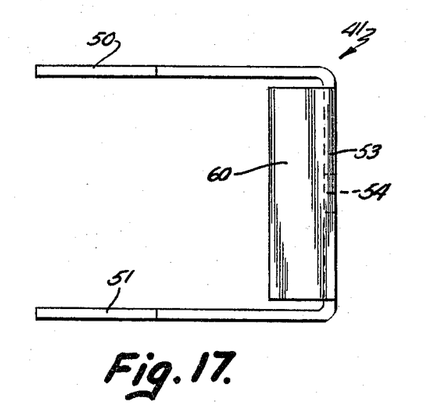
FIG. 17 is a plan view of a stake forming a portion of the corner lock.
Figure 18:
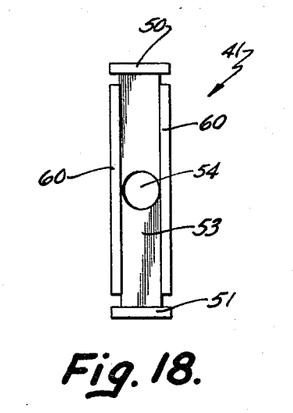
FIG. 18 is a front view of the stake of FIG. 17.
Figure 19:
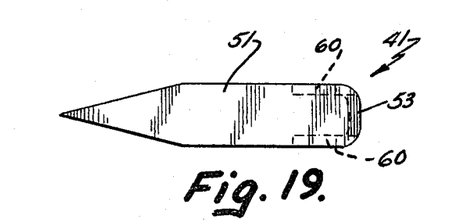
FIG. 19 is a side view of the stake of FIG. 17.
Figure 20:
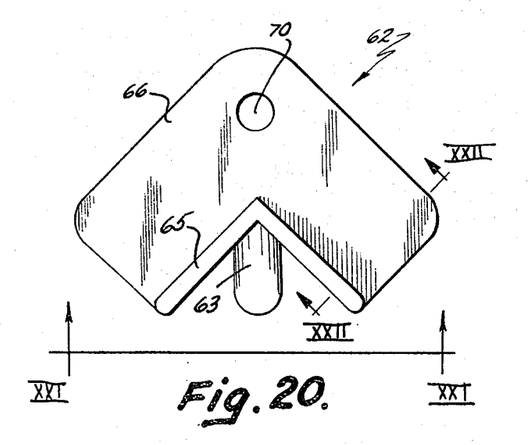
FIG. 20 is a plan view of a shelf hanger.
Figure 21:
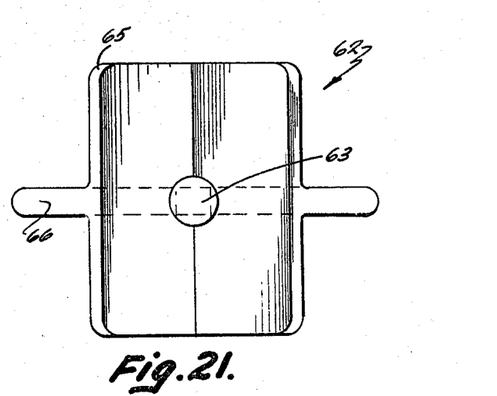
FIG. 21 is a view of the shelf hanger of FIG. 20 taken along line XXI—XXI in FIG. 20.
Figure 22:
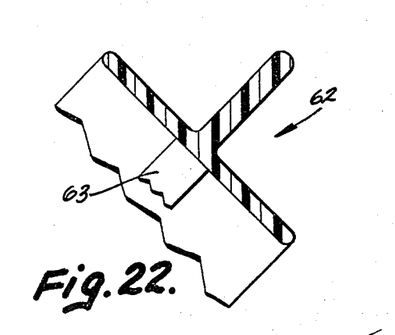
FIG. 22 is a partial sectional view of the shelf hanger of FIG. 20 taken along line XXII—XXII of FIG. 20.

With reference now to FIG. 11a, it is illustrated that a pair of corner connectors 12 may be used to interconnect modules 100 and 101. With reference now also to FIG. 16, a detailed view of one arm 38 and one projection 35 of one of the third extensions 33 of the corner connectors 12, it is illustrated that each of the projections 35 is provided with a cross-sectional shape corresponding to approximately one half of the cross-sectional area of the axially extending slots 25 in the elongate frame members in modules 100 and 101. This permits projections disposed on adjacent corner connectors 12 disposed in adjacent modules 100 and 101 to share a common axially extending slot such as the slot 105 in frame member 106 for the purpose of interconnecting the modules 100 and 101. With reference now to FIG. 11b, it is illustrated that as many as four corner connectors 12 may be used to interconnect four adjacent modules. Similarly of course, three corner connectors could be used to interconnect three modules, although that case is not illustrated herein.

Figure 28:
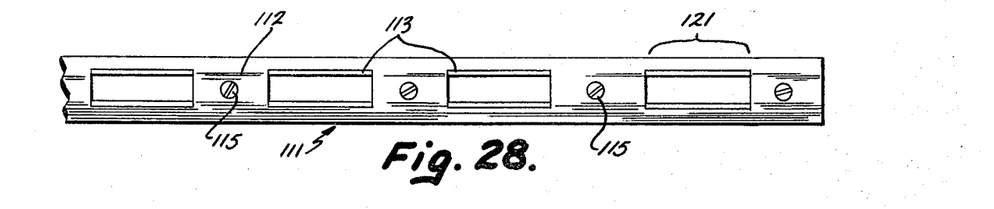
FIG. 28 is a partial elevational view of a hanger strip constructed according to the present invention.
Figure 29:
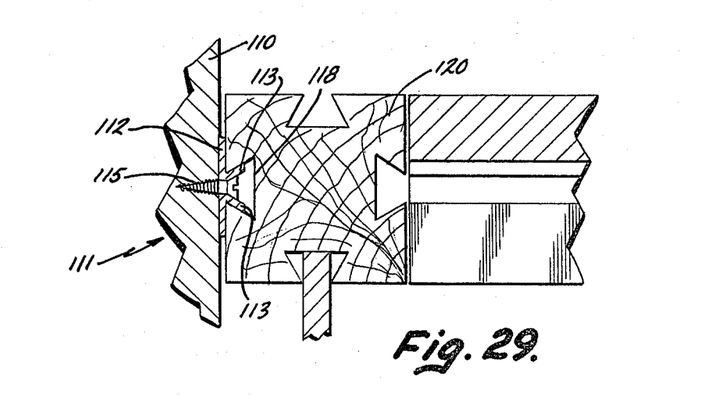
FIG. 29 is a partial sectional view of a cabinet or wall module mounted to a vertical wall with the hanger strip of FIG. 28.
Figure 30:
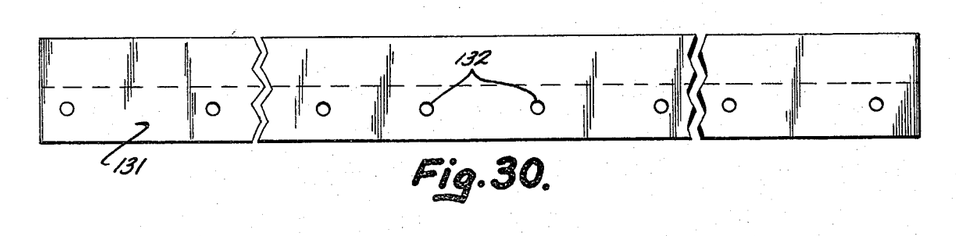
FIG. 30 is an elevational view of an alternative hanger strip.
Figure 31:
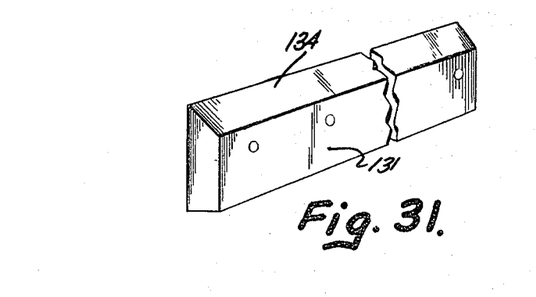
FIG. 31 is a perspective view of the hanger strip of FIG. 30.
Figure 32:
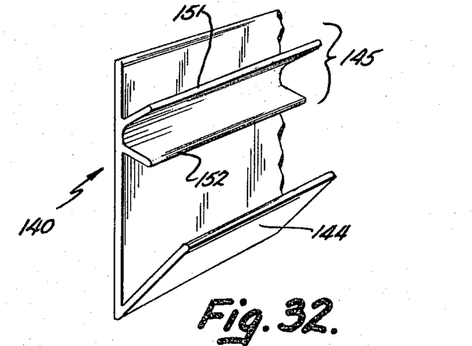
FIG. 32 is a perspective view of a portion of a hanger hook which cooperates with the hanger strip illustrated in FIGS. 30 and 31 for connecting a shelf or cabinet structure to a vertical wall.
Figure 33:
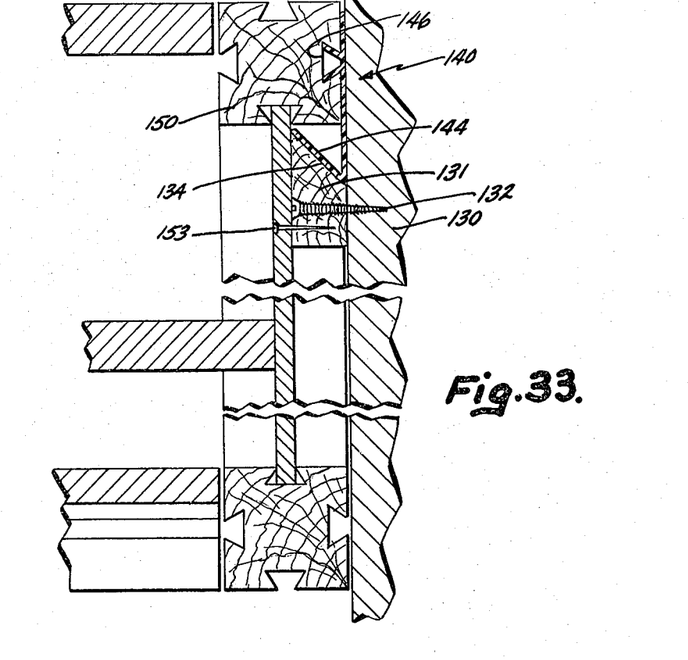
FIG. 33 is a partial sectional view of a shelf or cabinet structure hung from a vertical wall with the hanger strip and hanger hook illustrated in FIGS. 30-32.

With reference now to FIGS. 28 and 29, it is illustrated that the skeletal framework of the present invention may be adapted for supporting wall, shelf, furniture or other structural panels from a generally vertically oriented wall 110 and a wall hanger 111 is provided comprising an elongate hanger strip 112 and an elongate hanger extension disposed thereon. The elongate hanger strip is adapted for being fastened to the wall 110 in any suitable fashion such as by a plurality of screw-type fasteners 115. The elongate hanger extension 113 engages an axially extending slot 118 disposed in a horizontally oriented frame member 120. The elongate hanger extension preferably comprises a series of elongate finger sections 121 formed in the hanger strip 112. The elongate finger sections define a shape that roughly corresponds to the cross-sectional shape of the axially extending slot 118 in the horizontally extending frame member 120. Because of the stresses supposed upon the hanger strip 111, preferably the hanger strip is a stamped metal part slidably received in the axially extending slot 118 of the horizontal frame member 120.

With reference now to FIGS. 30, 31, 32 and 33, an alternative embodiment of the invention is illustrated wherein the skeletal framework of the present invention is adapted for supporting wall, furniture, shelf and other structural panels from a vertically oriented wall 130. In this case an elongate hanger strip 131 is provided which is adapted for being fastened to the wall 130 by any suitable means such as by a plurality of fasteners 132. The elongate hanger strip 131 includes a first inclined surface 134 extending upward and away from the wall 132 when the hanger strip 131 is mounted thereon. In this manner, the hanger strip 131 defines a groove of roughly V-shaped cross section therebetween. An elongate hanger hook 140 is provided which defines a second inclined surface 144. The second inclined surface 144 of the hanger hook 140 extends downwardly and toward the wall 130 when the elongate hanger hook is used to mount the structural framework of the present invention to a wall. The second inclined surface 144 of the hanger hook 140 engages the first inclined surface 134 of the hanger strip 131 such that the force of gravity cams the hook 140 into engagement with the hanger strip 131 and the wall 130. The hanger hook 140 includes a hanger extension 145 for engaging an axially extending slot 146 disposed on a horizontally oriented frame member 150. The hanger extension 145 preferably includes two elongate hanger extension arms 151 and 152 which define a shape at least roughly corresponding to the cross-sectional shape of the axially extending slot 146. Depending on the weight of the framework which is to be hung from the wall 130 by hook 140, the hook 140 may be formed from either a polymeric material or a metal material in a continuous extrusion process. If the hook 140 is formed from a polymeric material, preferably the hanger extension arms 151 and 152 will be provided with sufficient resiliency such that they may be urged together for the purpose of facilitating insertion of the hook 140 in the axially extending slot 146 of the horizontal frame member 150. However, in most cases a hook 140 formed from a metallic extrusion will be provided and the hanger extension 145 will be slidably received in the horizontal frame element 150. After the structure is mounted on the wall 130 a fastener 153 driven through a side panel and into the hanger strip 131 insures that the structure is not accidentally knocked off the wall.

Figure 2:
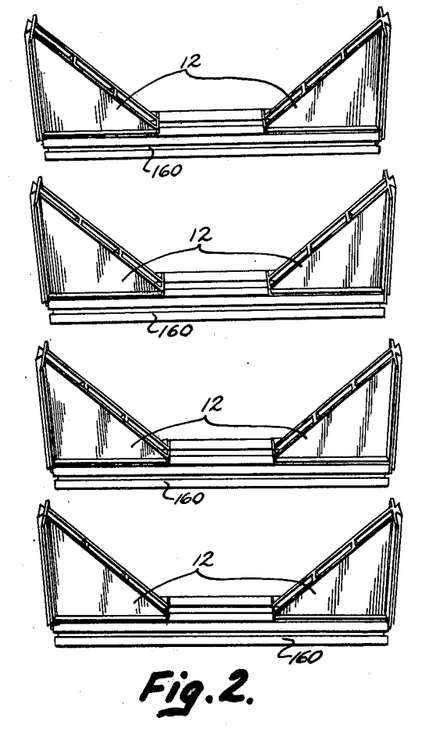

With reference now to FIGS. 1–9, a number of representative assembly steps for constructing a shelf or cabinet structure are illustrated. With specific reference to FIG. 1, a perspective view of the structural system of the present invention is illustrated prepackaged in kit form. FIG. 2 is a perspective view of a first assembly step for constructing a simple shelf or cabinet structure wherein a plurality of corner connectors 12 are slidably received on the ends of four elongate frame members 160. One of the first or second extensions on the corner connectors 12 is slidably received in an axially extending slot disposed on each of the frame members 160.

Figure 3:
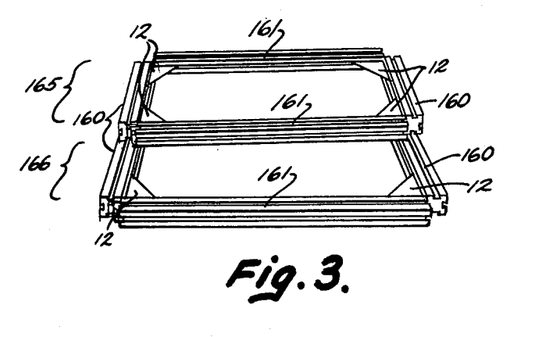
FIG. 3 is a perspective view of a second assembly step wherein four additional elongate frame members are combined with the structures assembled in FIG. 2 to form two rectangular frames.

FIG. 3 is a perspective view of a second assembly step wherein four additional elongate frame members (one of which is not illustrated in FIG. 3.) are combined with the structures assembled in FIG. 2 to form two rectangular frame members 165 and 166. The additional frame members 161 are slidably received by one of the first and second extensions disposed on the corner connectors 12.

Figure 4:
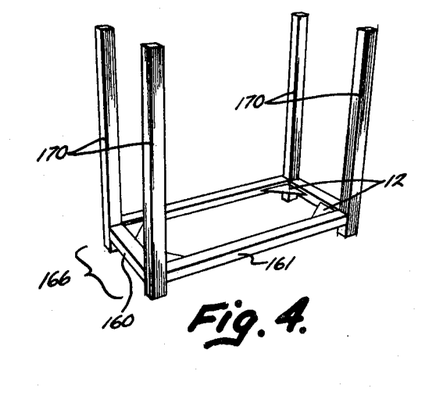
FIG. 4 is a perspective view of a third assembly step wherein four elongate upright frame members are added to one of the rectangular frame structures of FIG. 3 to define the outline of the shelf or cabinet structure.

FIG. 4 is a perspective view of a third assembly step wherein four additional elongate upright frame members 170 are added to the rectangular frame structure 166 formed in FIG. 3 to define the outline of a shelf or cabinet structure. The additional elongate upright frame members 170 are slidably received in the third extensions of each of the corner connectors 12 of the rectangular frame structure 166. Thereafter, a plurality of corner locks are inserted into the corner connectors 12 in the manner previously described for rigidly securing the frame members 160, 161 and 170.

Figure 5:
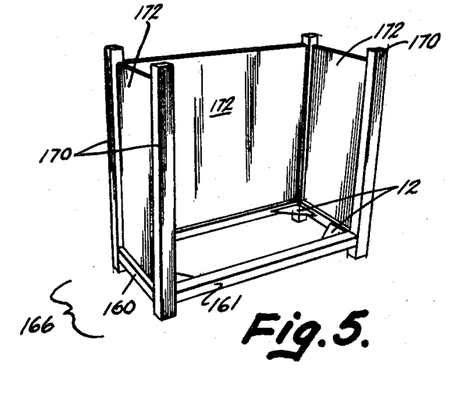
FIG. 5 is a perspective view of a fourth assembly step wherein a plurality of side panels are added to the cabinet or shelf structure.

FIG. 5 is a perspective view of a fourth assembly step wherein a plurality of side panels 172 are added to the cabinet or shelf structure. The side panels 172 are slidably received in the axially extending slots disposed in the frame members 160, 161 and 170. This is perhaps best illustrated in FIGS. 26 and 27 wherein side panels 172 are illustrated engaging the axially extending slots of frame members 22 and 23.

Figure 6:
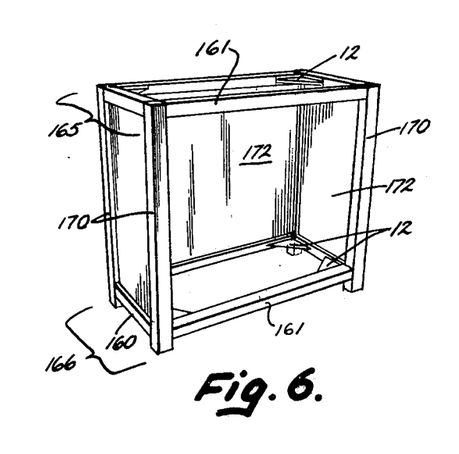
FIG. 6 is a perspective view of a fifth assembly step wherein the second rectangular frame of FIG. 3 is added to the structure of FIG. 5 to form the top of the cabinet or shelf structure.

FIG. 6 is a perspective view of a fifth assembly step wherein the second rectangular frame 165 illustrated in FIG. 3, is added to the top of the structure illustrated in FIG. 5. The upright frame members 170 are received in the third extensions of the corner connectors 12 of the second rectangular structure 165. Thereafter, corner locks are inserted in the connectors 12 to rigidly secure the second rectangular frame 165 to the remainder of the structure.

Figure 7:
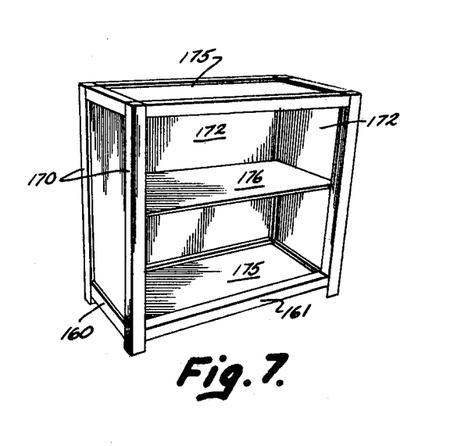
FIG. 7 is a perspective view of a sixth assembly step wherein shelf panels are added to the structure of FIG. 6 to provide a finished freestanding shelf structure.

FIG. 7 is a perspective view of a sixth assembly step wherein shelf panels 175 and 176 are added to the structure illustrated in FIG. 6. In the case of the uppermost and lowermost shelf panels 175, these panels simply rest on the triangular web (not illustrated in FIG. 7) which forms a portion of each of the corner connectors 12. If desirable, thereafter a plurality of suitable fasteners may be used to secure the upper and lower shelves 175 to the corner connectors 12. The intermediate shelf 176 is mounted to the upright frame members 170 with a suitable shelf hanger such as the shelf hanger 62 illustrated in FIGS. 20–22. The shelf hangers 62 (not illustrated in FIG. 7) are simply inserted in one of a plurality of apertures normally provided on the upright frame members 170 at the elevation at which the intermediate shelf 176 is desired. Thereafter, the intermediate shelf 176 rests on the shelf hangers so installed. As previously described, fasteners may be added to the shelf hangers to further increase the structural rigidity of the shelf or cabinet structure. FIG. 7 is a perspective view of a seventh assembly step wherein a pair of doors 180 are added to the cabinet or shelf structure of FIG. 7. The doors 180 are connected to the upright frame members 170 of the front of the cabinet or shelf structure with a pair of door hinges such as the door hinge illustrated in FIG. 23. The door hinge 74 (not illustrated in FIG. 8) is first suitably secured to one of the doors 180 and then the door hinge extensions carried on the door hinge are simply inserted into axially extending slots carried by the elongate frame members 170. Since a pair of doors are used to enclose the cabinet of FIG. 8, a door stop is not provided. However, it should be understood that if a single door were to be used covering the front of the cabinet or shelf structure illustrated in FIG. 8, a door stop like that illustrated in FIG. 24 could be used on the frame member 170 opposing the frame member carrying the door hinge.

Figure 8:
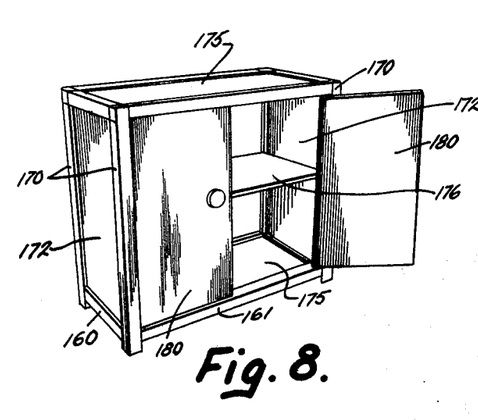
FIG. 8 is a perspective view of a seventh assembly step wherein optional doors are added to the shelf structure of FIG. 7.
Figure 9:
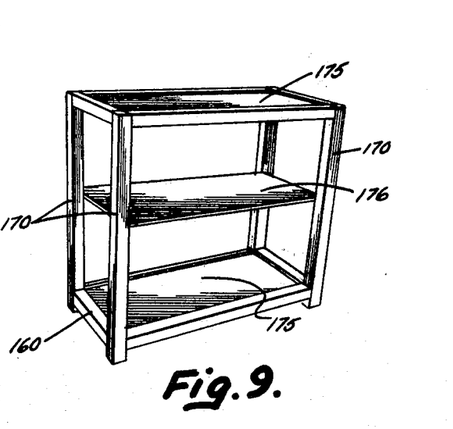
FIG. 9 is a perspective view of an alternative shelf structure that may be constructed according to the present invention by eliminating the assembly step in which the side panels are installed.

FIG. 9 is a perspective view of an alternative shelf structure that may be constructed according to the present invention by eliminating the step illustrated in FIG. 5 wherein a plurality of side panels are added to the structure and eliminating the step illustrated in FIG. 8 wherein a front door structure is added. In this case, a simple freestanding shelf structure results.

A wide variety of structures can be constructed with the structural system of the present invention. Various levels of quality and perceived value can be accomplished by varying the selection of frame and panel insert materials which are provided in the construction kit. For example, utility kits might be provided for constructing utilitarian structures for the workshop, garage or basement having frame members made from relatively soft woods and panel inserts constructed from masonite, aspenite and/or pegboard. In work centers such as sewing rooms, offices or children's bedrooms, various other structures may be formed from frame members made of soft or hard woods and with panel inserts that are wallpapered or textured. Furthermore, furniture quality structures may be formed for a living room, den or recreation room having hardwood frame members and panel inserts formed from exotic woods or plexiglass, etc.

The above description should be considered exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. Apparatus for constructing a skeletal framework for supporting wall, furniture and structural panels comprising:
    a plurality of elongate frame members each having a generally rectangular cross section;
    at least one side of each of said frame members having an axially extending slot;
    each of said axially extending slots having a cross-sectional shape substantially wider in some areas than the entrance width of said axially extending slots;
    a plurality of corner connectors for interconnecting first, second and third frame members extending in different angular orientations;
    said plurality of corner connectors each having first, second and third extensions for extending into and engaging axially extending slots disposed on said first, second and third frame members, respectively;
    said first and second extensions being provided with a portion roughly corresponding to the cross-sectional shape of said axially extending slots on said first and second frame members;
    said third frame member being provided with at least two axially extending slots;
    said third extension comprising a bifurcated member having first and second projections extending into said two axially extending slots disposed on said third frame member, said first and second projections at least partially corresponding to the cross-sectional shape of said two axially extending slots;
    a plurality of corner locks;
    said plurality of corner connectors each having means for receiving one of said corner locks; and
    each of said corner locks comprising a stake for extending through said corner connectors and engaging said first and second frame members, and a fastener extending through said stake and said corner connectors, said fastener engaging said third frame member for drawing said first, second and third frame members and said corner connectors theretogether.

2. The apparatus of claim 1 wherein said plurality of corner connectors each comprise a roughly triangular web interconnecting said first second and third extensions.

3. The apparatus of claim 1 wherein said axially extending slots are provided with a roughly dovetail-shaped cross section.

4. The apparatus of claim 1 wherein said stake is roughly U-shaped and includes first and second blades for engaging said first and second frame members, respectively.

5. The apparatus of claim 4 wherein said corner connectors each comprise a web interconnecting said first, second and third extensions.

6. The apparatus of claim 5 wherein said means for receiving said corner locks is disposed in said web and comprises means for slidably guiding said first and second blades into said first and second frame members, respectively.

7. The apparatus of claim 6 wherein said first and second blades are roughly parallel.

8. The apparatus of claim 7 wherein said first and second frame members are separated by an arc of approximately 90° and said first and second frame members abut said third frame member and one of said corner connectors.

9. The apparatus of claim 8 wherein said means for receiving said corner locks directs said first and second blades into said first and second frame members at an angle intermediate along said 90° arc such that said first and second blades urge said first and second frame members into firm engagement with said third frame member and said one corner connector.

10. The apparatus of claim 9 wherein said stake further comprises a platform extending between said first and second blades said platform including means for receiving said fastener.

11. The apparatus of claim 10 wherein said web further includes means for receiving and guiding said fastener into said third frame member such that when said fastener engages said third frame member it urges said first and second blades into engagement with said first and second frame members.

12. Apparatus for constructing a skeletal framework for supporting wall, furniture and structural panels comprising:
- a plurality of elongate frame members each having a generally rectangular cross section;
- at least one side of each of said frame members having an axially extending slot;
- each of said axially extending slots having a cross-sectional shape substantially wider in some areas than the entrance width of said axially extending slots;
- a plurality of corner connectors for interconnecting first, second and third frame members extending in different angular orientations;
- said plurality of corner connectors each having first, second and third extensions for extending into and engaging axially extending slots disposed on said first, second and third frame members, respectively;
- a plurality of corner locks;
- said plurality of corner connectors each having means for receiving one of said corner locks;
- each of said corner locks comprising a stake for extending through said corner connectors and engaging said first and second frame members, and a fastener extending through said stake and said corner connectors, said fastener engaging said third frame member for drawing said first, second and third frame members and said corner connectors theretogether;
- said third frame member being provided with at least two axially extending slots disposed on adjacent sides of said third frame member;
- said third extension being bifurcated and comprising first and second projections disposed on first and second arms, respectively, said first and second arms extending at least partially along adjacent sides of said third frame member, said first and second projections extending into said two axially extending slots disposed on adjacent sides of said third frame member, and said first and second projections having a cross-sectional shape at least partially corresponding to the cross-sectional shape of said axially extending slots;
- said stake being roughly U-shaped and including first and second blades for engaging said first and second frame members, respectively; and
- said means for receiving said corner locks comprising means for slidably guiding said first and second blades into engagement with said first and second frame members, respectively.

13. The apparatus of claim 12 wherein said plurality of corner connectors each comprise a roughly triangular web interconnecting said first, second and third extensions.

14. The apparatus of claim 12 wherein said first and second extensions are provided with a cross section corresponding in shape to the cross-sectional area of said axially extending slots.

15. The apparatus of claim 12 wherein said axially extending slots are provided with a roughly dovetail-shaped cross section.

16. The apparatus of claim 12 wherein said first and second blades are roughly parallel.

17. The apparatus of claim 16 wherein said first and second frame members are separated by an arc of approximately 90° and said first and second frame members abut said third frame member and one of said corner connectors.

18. The apparatus of claim 17 wherein said means for receiving said corner locks directs said first and second blades into said first and second frame members at an angle intermediate along said 90° arc such that said first and second blades urge said first and second frame members into firm engagement with said third frame member and said one corner connector.

19. The apparatus of claim 18 wherein said stake further comprises a platform extending between said first and second blades, said platform including means for receiving said fastener.

20. The apparatus of claim 19 wherein said means for receiving said corner locks further includes means for receiving and guiding said fastener into said third frame member such that when said fastener engages said third frame member it urges said first and second blades into engagement with said first and second frame members.

21. The apparatus of claim 1 or 12 wherein said skeletal framework is adapted for supporting shelf panels and a plurality of shelf hangers are provided, said shelf hangers comprising:
- a post for insertion in an aperture disposed in a vertically oriented frame member;
- a shoulder surrounding said post for engaging the side of said vertically oriented frame member; and
- a flange extending from said post and said shoulder for supporting said shelf panel.

22. The apparatus of claim 21 wherein said flange extends along adjacent sides of said vertically oriented frame member and said post extends into an aperture disposed at the intersection of adjacent sides of said vertically oriented frame member.

23. The apparatus of claim 1 or 12 wherein said skeletal framework is adapted for supporting a door panel and a hinge member is provided comprising:
- an elongate hinge hanger for engaging an axially extending slot disposed on a vertically oriented frame member;
- an elongate hinge flange for engaging one end of said door panel; and
- an elongate living hinge disposed therebetween, said hinge hanger, hinge flange and living hinge being formed together in a continuous extrusion process.

24. The apparatus of claim 23 wherein said hinge hanger comprises two elongate resilient hinge arms oriented such that said hinge arms define a shape at least roughly corresponding to a portion of the cross-sectional shape of said axially extending slots whereby said two hinge arms may be urged together to facilitate insertion into said axially extending slot disposed in said vertically oriented frame member.

25. The apparatus of claim 1 or 12 wherein said skeletal framework is adapted for supporting a door panel and a door panel stop member is provided comprising:
 a door stop hanger for engaging an axially extending slot disposed on a vertically oriented frame member; and
 a door stop flange for providing an abutment for one edge of said door panel.

26. The apparatus of claim 25 wherein said door stop hanger comprises two elongate resilient door stop hanger arms oriented such that said door stop arms define a shape at least roughly corresponding to a portion of the cross-sectional shape of said axially extending slots, whereby said two door stop arms may be urged together to facilitate insertion into said axially extending slot disposed in said vertically oriented frame member.

27. The apparatus of claim 25 wherein said door stop hanger and said door stop flange are both elongate members formed together in a continuous extrusion process.

28. The apparatus of claims 1 or 12 wherein said skeletal framework is adapted for supporting modules of wall, furniture and other structural panels and a module connector is provided comprising first and second module extensions mounted in a back-to-back relationship, said first and second module extensions engaging axially extending slots in a pair of adjacent vertically oriented frame members disposed in adjacent modules.

29. The apparatus of claim 28 wherein said first and second module extensions are provided with a cross-sectional shape corresponding roughly to the cross-sectional shape of said axially extending slots.

30. The apparatus of claim 28 wherein said first and second module extensions comprise elongate members formed in a continuous extrusion process.

31. The apparatus of claim 1 or 12 wherein said skeletal framework is adapted for supporting wall, furniture and other structural panels from a generally vertically oriented wall and a wall hanger is provided comprising:
 an elongate hanger strip adapted for being fastened to said wall in a generally horizontal orientation; and
 an elongate hanger extension disposed on said hanger strip said elongate hanger extension being slidably received by an axially extending slot disposed on a horizontally extending frame member.

32. The apparatus of claim 31 wherein said elongate hanger extension comprises a series of elongate finger sections formed in said hanger strip said finger sections defining a shape that roughly corresponds to the cross-sectional shape of said elongate slots.

33. The apparatus of claims 1 or 12 wherein said skeletal framework is adapted for supporting wall, furniture and other structural panels from a vertically oriented wall and a wall hanger is provided comprising:
 an elongate hanger strip adapted for being fastened to said wall in a generally horizontal orientation;
 a first inclined surface disposed on said hanger strip, said first inclined surface extending upward and away from said wall;
 an elongate hanger hook defining a second inclined surface, said second inclined surface extending downward and toward said wall for engaging said first inclined surface and camming said hook into engagement with said hanger strip;
 a hanger extension disposed on said hanger hook, said hanger extension engaging one of said axially extending slots disposed on a horizontally oriented frame member.

34. The apparatus of claim 33 wherein said hanger extension comprises two elongate resilient hanger extension arms oriented such that said hanger extension arms define a shape at least roughly corresponding to a portion of the cross-sectional shape of said axially extending slots, whereby said hanger extension arms may be urged together to facilitate insertion into said axially extending slot disposed in said horizontally oriented frame member.

35. The apparatus of claim 34 wherein said elongate hanger hook and said elongate hanger extension are formed together in an extrusion process.

36. The apparatus of claims 1 or 12 wherein each of said frame members is provided with a plurality of axially extending slots and wall, furniture and other structural panels are mounted within said axially extending slots.

37. The apparatus of claims 1 or 12 wherein said web disposed on said corner member supports horizontally extending wall, furniture and other structural panels.

38. The apparatus of claims 1 or 12 wherein said skeletal framework support modules of wall, furniture and other structural panels, said modules being interconnected by said corner connectors.

39. The apparatus of claim 38 wherein said first and second projections disposed on said corner connectors are provided with a shape corresponding to approximately one-half the cross-sectional area of said axially extending slots, whereby projections on adjacent corner connectors disposed in adjacent modules may share a common axially extending slot for the purpose of interconnecting said modules.

* * * * *